(12) United States Patent
Parenti et al.

(10) Patent No.: US 11,423,639 B2
(45) Date of Patent: Aug. 23, 2022

(54) HIDDEN CAMERA DETECTION SYSTEMS AND METHODS

(71) Applicant: Ford Global Technologies, LLC, Dearborn, MI (US)

(72) Inventors: Robert Parenti, Dearborn, MI (US); Cynthia Neubecker, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/945,660

(22) Filed: Jul. 31, 2020

(65) Prior Publication Data
US 2022/0036119 A1  Feb. 3, 2022

(51) Int. Cl.
| | | |
|---|---|---|
| G06K 9/46 | (2006.01) | |
| G06K 9/00 | (2022.01) | |
| G06V 10/60 | (2022.01) | |
| H04N 5/33 | (2006.01) | |
| G06V 20/59 | (2022.01) | |
| G08B 5/22 | (2006.01) | |

(52) U.S. Cl.
CPC .............. *G06V 10/60* (2022.01); *G06V 20/59* (2022.01); *H04N 5/33* (2013.01); *G06V 2201/05* (2022.01); *G08B 5/22* (2013.01)

(58) Field of Classification Search
CPC ............. G06K 9/4661; G06K 9/00832; G06K 2209/09; G08B 5/22; H04N 5/33
See application file for complete search history.

(56) References Cited

U.S. PATENT DOCUMENTS

| | | | | | |
|---|---|---|---|---|---|
| 4,757,304 A | * | 7/1988 | Rho | ..................... | B60R 25/1004 340/565 |
| 5,185,638 A | * | 2/1993 | Conzola | ............... | G02B 6/0006 362/575 |
| 5,566,951 A | * | 10/1996 | Dart | ...................... | A63F 13/213 273/358 |
| 5,903,712 A | * | 5/1999 | Wang | .................. | B41F 33/0045 358/1.9 |

(Continued)

FOREIGN PATENT DOCUMENTS

| | | |
|---|---|---|
| DE | 102013019138 A1 | 5/2015 |
| JP | 2002156464 A | 1/2002 |
| KR | 20180051240 A | 5/2018 |

OTHER PUBLICATIONS

Feeke "Anti Spy Detector, RF Detector & Camera Finder, Bug Detector, Upgraded RF Signal Detector, Feeke GSM Tracking Device for Wireless Audio Bug Hidden Camera Detector (Black)" (Jun. 2019) pp. 1-11.

(Continued)

*Primary Examiner* — Philip P. Dang
(74) *Attorney, Agent, or Firm* — Frank Lollo; Eversheds Sutherland (US) LLP (57) ABSTRACT

Hidden camera detection systems and methods are disclosed herein. An example method includes illuminating a surface with infrared light, obtaining an image of the surface using an infrared camera, and determining the presence of a hidden camera associated with the surface by determining a difference in spectral reflectance between how the infrared light is reflected off of the hidden camera as compared to how the infrared light is reflected off of the surface.

17 Claims, 5 Drawing Sheets

(56) References Cited

U.S. PATENT DOCUMENTS

| | | | | |
|---|---|---|---|---|
| 6,665,079 B1* | 12/2003 | Tocci | | G02B 5/12 356/614 |
| 7,132,653 B2* | 11/2006 | Faubion | | B61K 9/06 348/588 |
| 7,188,014 B1* | 3/2007 | Liao | | B60R 1/00 362/494 |
| 7,239,974 B2* | 7/2007 | Gulati | | G01J 5/0003 73/76 |
| 7,499,638 B2* | 3/2009 | Arai | | G01S 17/86 348/370 |
| 7,676,767 B2* | 3/2010 | Hofmeister | | G06F 3/0483 715/702 |
| 8,169,311 B1* | 5/2012 | Breed | | B60R 21/01536 340/539.22 |
| 8,364,439 B2* | 1/2013 | Mintz | | G01G 23/3735 701/124 |
| 8,405,714 B2* | 3/2013 | Matsushima | | G06V 40/19 348/78 |
| 8,583,313 B2* | 11/2013 | Mian | | B61G 7/04 701/19 |
| 8,896,701 B2* | 11/2014 | Brown | | H04N 5/33 348/165 |
| 8,961,695 B2* | 2/2015 | Romanov | | A47L 11/4066 15/340.1 |
| 9,357,920 B2* | 6/2016 | Yates | | A61B 3/14 |
| 9,442,350 B2* | 9/2016 | Samardzic | | H04N 5/2252 |
| 9,672,419 B2* | 6/2017 | Blazevic | | G07F 17/3241 |
| 9,725,013 B2* | 8/2017 | Romanov | | B60L 50/66 |
| 9,749,607 B2* | 8/2017 | Boles | | H04N 1/484 |
| 9,791,924 B2* | 10/2017 | Shiu | | G02B 27/0172 |
| 9,827,489 B2* | 11/2017 | Yale | | A63F 13/25 |
| 9,940,710 B2* | 4/2018 | Watanabe | | A61B 5/0033 |
| 10,228,500 B2* | 3/2019 | Ooi | | G02B 5/223 |
| 10,474,916 B2* | 11/2019 | Krishnan | | G06V 20/59 |
| 10,653,328 B2* | 5/2020 | Watanabe | | G06V 10/145 |
| 10,670,740 B2* | 6/2020 | Couture | | G01V 5/0016 |
| 10,706,295 B2* | 7/2020 | Cionca | | G06V 20/58 |
| 11,066,006 B2* | 7/2021 | Kitazawa | | F21S 41/65 |
| 2004/0130442 A1* | 7/2004 | Breed | | B60C 19/00 340/449 |
| 2009/0190824 A1* | 7/2009 | Niimura | | G01N 21/9515 382/141 |
| 2012/0075093 A1 | 3/2012 | Cheng | | |
| 2013/0093894 A1* | 4/2013 | Zlotnikov | | G08G 1/0175 348/148 |
| 2014/0015944 A1* | 1/2014 | O'Donnell | | G06V 10/143 348/61 |
| 2017/0333941 A1* | 11/2017 | Park | | B05D 5/08 |
| 2019/0154439 A1* | 5/2019 | Binder | | G01B 11/026 |
| 2019/0196020 A1* | 6/2019 | Aceti | | G01S 17/87 |
| 2019/0372449 A1* | 12/2019 | Mills | | G21B 3/00 |
| 2020/0312075 A1* | 10/2020 | Kakkar | | G06V 40/40 |
| 2021/0127051 A1* | 4/2021 | Lai | | H04N 5/23232 |
| 2021/0129868 A1* | 5/2021 | Nehmadi | | G01C 21/26 |

OTHER PUBLICATIONS

"RF Detector Hidden Camera Detector" Lawmate International Co., LTD.

* cited by examiner

HIDDEN CAMERA DETECTION SYSTEMS AND METHODS

BACKGROUND

Camera improvements have revolutionized new machine vision and consumer applications. However, the reduction in camera size and cost has also made them more accessible for malicious applications. As a result, new devices are emerging to help consumers discover hidden electronics. Today, however, these devices rely on heat signature, electronic interference, or network connectivity to discover a hidden device. Whether or not consumers carry these devices, most consumers expect privacy, whether it is in a hotel room or a ride hail vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is generally directed to hidden camera detection systems and methods of use. An example device can be configured to emit infrared (IR) or near-IR light at a surface of interest. An infrared camera can be configured to obtain images of the surface. IR light reflected off of the surface can be measured by the infrared camera. When a hidden object is integrated within the surface or positioned behind an aperture in the surface, the IR light emitted may be differentially reflected as compared with the IR light that reflects off the surrounding surface. That is, the presence of a hidden object can be determined by a measured difference in spectral reflectance between how the infrared light is reflected off the hidden object as compared to how the infrared light is reflected off the surrounding surface.

Illustrative Embodiments

Figure 1:
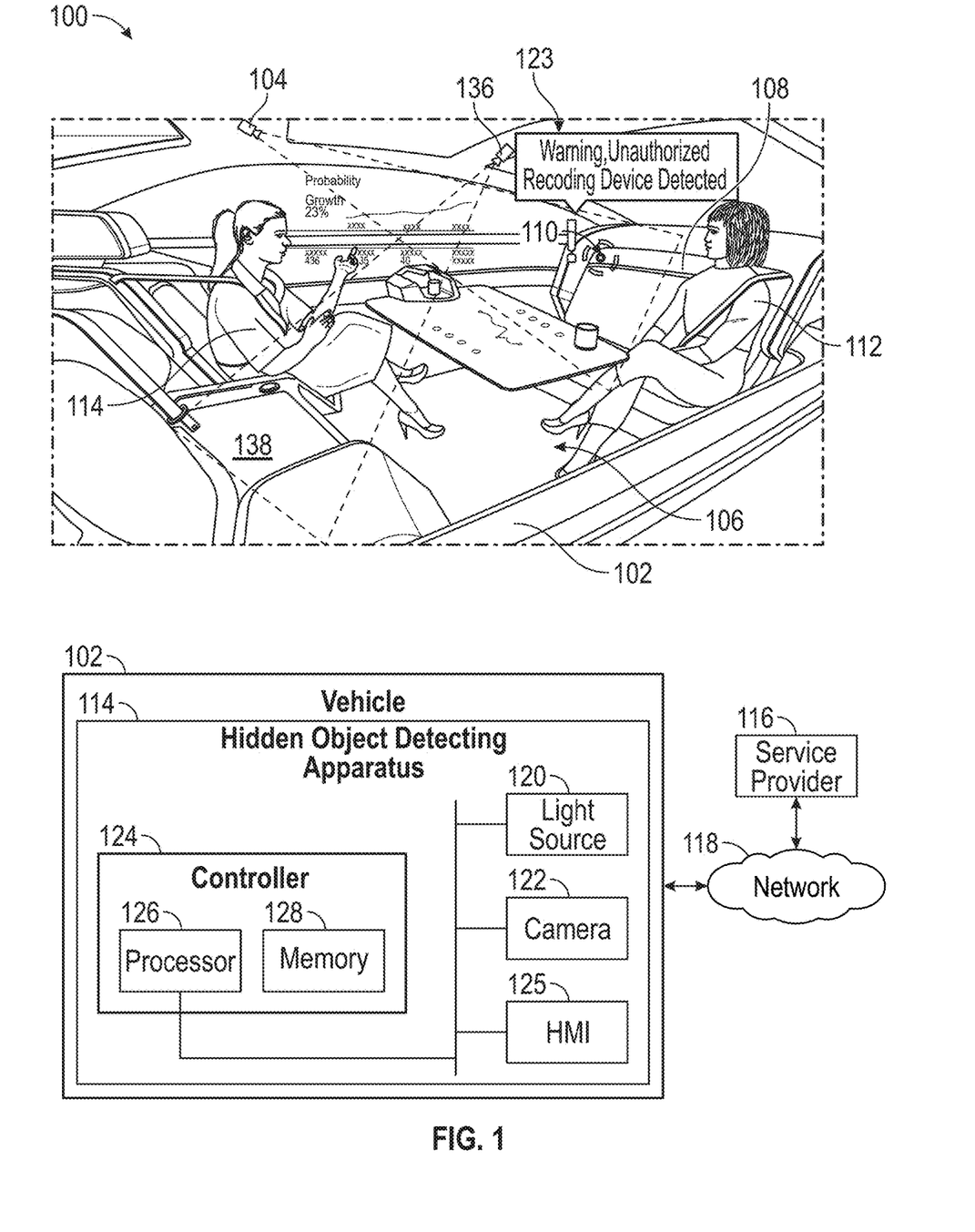
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The architecture 100 can include a vehicle 102 and a hidden object detecting apparatus 104. The vehicle 102 can include a vehicle cabin or interior 106 having a surface 108 such as a seat. While the surface 108 has been disclosed as being a seat, the surface 108 can include any surface within the interior 106. The hidden object detecting apparatus 104 can detect the presence of a hidden object 110, or at least an area of the surface 108 that may be likely to include a hidden object. The hidden object detecting apparatus 104 can be configured to warn a passenger, such as passengers 112 and 114 that a hidden object has been detected in the interior 106.

The vehicle 102 could include an autonomous vehicle or a legacy vehicle. When the vehicle 102 is adapted for use in a ridesharing or public transportation paradigm, the vehicle 102 communicates with a service provider 116 over a network 118. The service provider 116 could be configured to manage ride-haling requests for riders. The network 118 could include any public and/or private networks, which can include long-range and short-range wireless communications, as well as cellular and the like. The vehicle 102 and the service provider 116 can include devices or components that allow each to access the network 118 or communicate with one another over a short-range connection such as Bluetooth or Near-field communications.

It will be understood that while example use cases disclosed herein may involve the hidden object detecting apparatus 104 being used to detect hidden objects in vehicles, the use of the hidden object detecting apparatus 104 is not so limited and can be used to detect hidden objects in other locations of interest. The hidden object detecting apparatus 104 can comprise a light source 120, a camera 122, a controller 124, and a human machine interface (HMI) 125. Generally, the light source 120 can be configured to emit IR light or near-IR light. While IR band radiation has been disclosed, it will be understood that the light source 120 can be tuned to emit light in any visible or invisible portion of the light spectrum to detect various hidden objects. The specific wavelength(s) of light selected can be tuned based on the reflective properties of the hidden object 110.

The camera 122 can be configured to capture images of the light emitted by the light source 120 as it is reflected off the surface 108 and/or the hidden object 110. For example, the camera 122 can be configured to sense IR or near-IR light.

The controller 124 can comprise at least a processor 126 and memory 128. The memory 128 stores instructions that can be executed by the processor 126. For example, the processor 126 can execute logic stored in the memory 128 to determine differences in spectral reflectance between how the infrared light is reflected off of the hidden object 110 as compared to how the infrared light is reflected off of the surface 108. The controller 124 can be configured to sense the spectrum of light emitted by the light source 120 and sensed by the camera 122. When referring to actions performed by the controller 124, this includes execution of instructions stored in memory 128 by the processor 126.

Also, it will be noted that when the controller 124 detects a hidden object, the controller 124 can be configured to present a message 123 that alerts a user when the hidden object is determined. The user may be the occupant and/or the owner of the vehicle. For example, the controller 124 can cause a message to be visually displayed on the human machine interface 125, or announced audibly by an audio system associated with the human machine interface 125.

While some descriptions of the hidden object detecting apparatus 104 disclose a standalone device, aspects of the present disclosure can be implemented using existing in-vehicle cameras and light sources. The functionalities described as being performed by the controller 124 could be integrated into another system of the vehicle 102.

Figure 2:
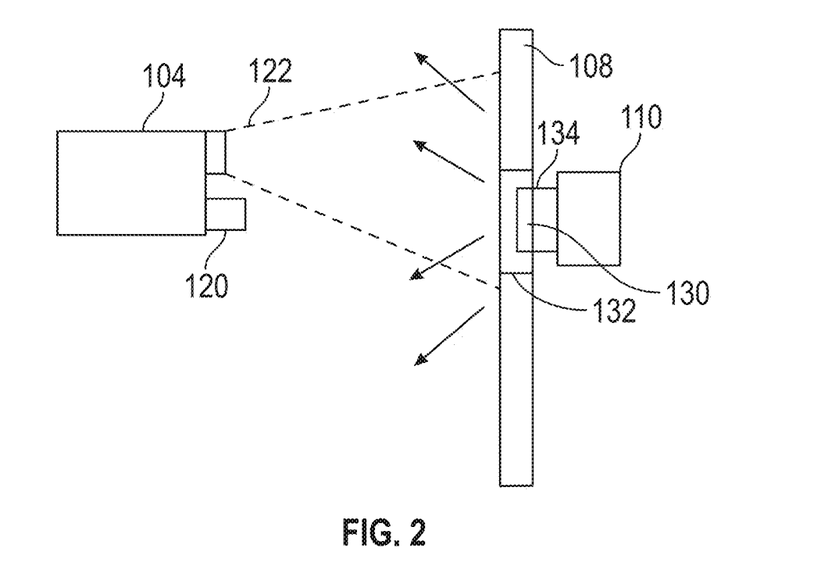
FIG. 2 illustrates an example of a hidden object detecting apparatus detecting the presence of a hidden object associated with a surface.

Referring now to FIG. 2, the hidden object detecting apparatus 104 is illustrated in combination with an example embodiment of the hidden object 110 in the form of a camera. Generally, the hidden object 110 can be placed in association with the surface 108 (either recessed behind, flush, or in front of). In one configuration, the hidden object 110 may be placed behind a pinhole or other aperture 130 fabricated into the surface 108. The hidden object 110 could be placed by a malicious actor.

The hidden object 110 can comprise a component 132 that either preferentially absorbs or reflects IR or near-IR light. In this example, the component 132 is arranged in combination with hidden object sensors or lenses 134 of the hidden object 110. When the camera is a color camera, it may possess a cut filter (e.g., filter material) which is applied to either a sensor or lens of the camera to improve image quality. An example cut filter could include a hot mirror that reflects IR light. However, another commonly used cut filter can include a heat absorbing glass or mirror.

Referring back to FIG. 1, the controller 124 is configured to cause the light source 120 to emit light and for the camera 122 to obtain images of objects illuminated by the light. The controller 124 can obtain the images from the camera 122 and perform image analysis to determine differences in spectral reflectance (e.g., how the surface reflects the IR light versus how the hidden object reflects the IR light). For example, the controller 124 can be configured to detect any area or areas in an image where there are differences in spectral reflectance on the image.

Figure 3:
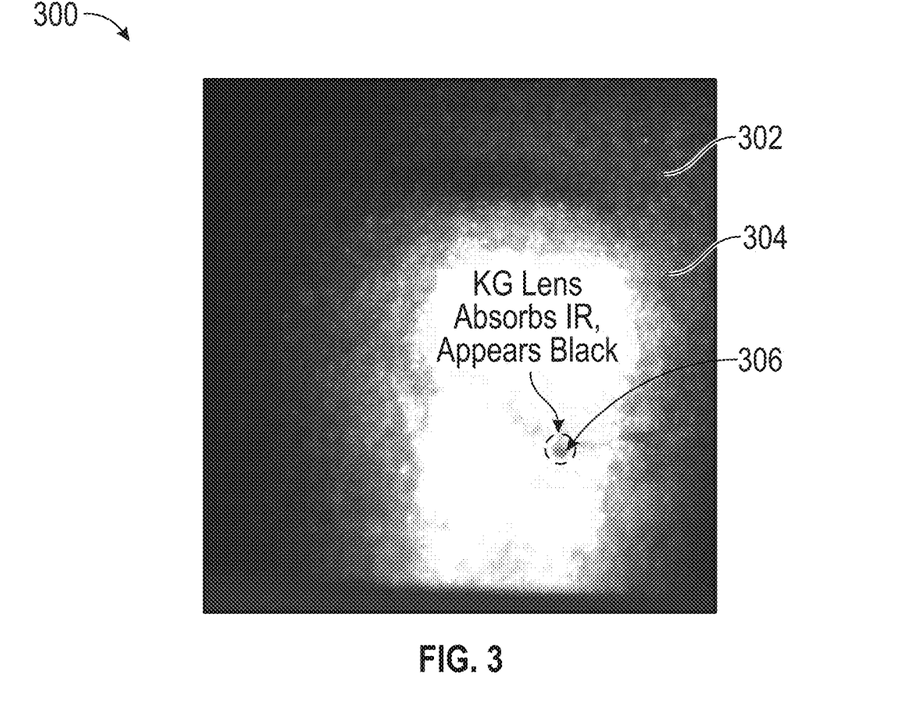
FIG. 3 is an image illustrating differences in spectral reflectance between a surface and a hidden object, due to light absorption by the hidden object.
Figure 4:
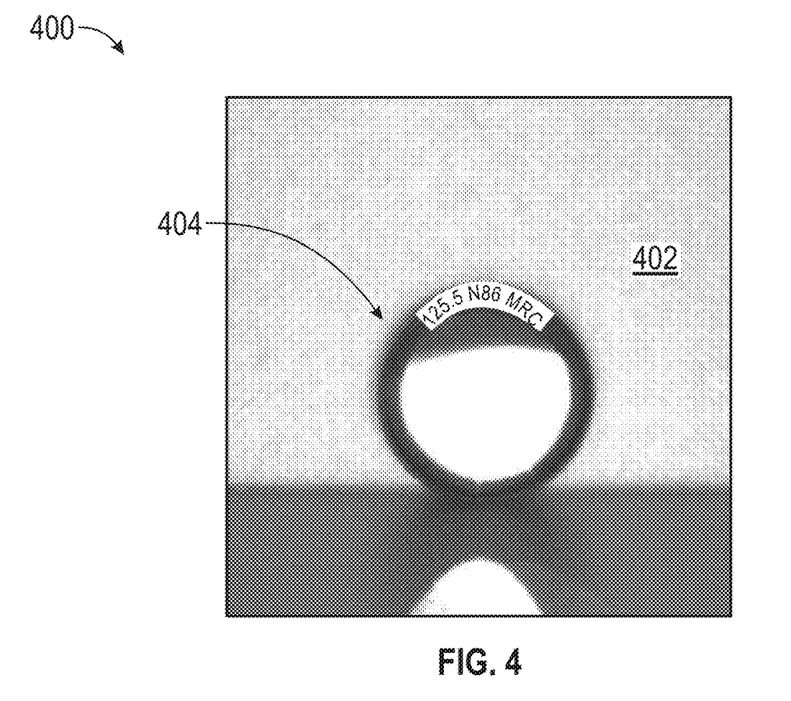
FIG. 4 is an image illustrating differences in spectral reflectance between a surface and a hidden object, due to enhanced light reflectance by the hidden object.

Broadly, the controller 124 can be configured to determine a difference in spectral reflectance between how the infrared light is reflected off a hidden camera (or other object of interest) as compared to how the infrared light is reflected off a surrounding surface. Generally, the controller 124 can be configured to determine when differences in spectral reflectance are indicative of a hidden object. For example, the controller 124 can determine differences in spectral reflectance compared to a threshold or expected value. Empirical testing can be used to create these threshold or expected values. FIGS. 3 and 4 each illustrate views obtained by the hidden object detecting apparatus 104 of a hidden object with a hot mirror, and alternatively a hidden object with a heat absorbing glass, respectively.

FIG. 3 illustrates an example image 300 of a surface 302 that has been illuminated with IR light. An area of reflectance 304 shows uniform reflectance of IR light by the surface 302. An area of differential spectral reflectance 306 is also present in the image 300. For example, the differential spectral reflectance 306 absorbs IR light to a greater degree than the surface 302. This produces a darker area where the differential spectral reflectance 306 is present. This darker area is caused by absorption of IR light by a heat absorbing glass.

FIG. 4 illustrates an example image 400 of a surface 402 that has been illuminated with IR light. A component of a hidden object 404 preferentially reflects IR light as compared with how the IR light reflects off the surface 402. This difference in spectral reflectance is indicative of a hidden camera with a hot mirror filter. This lighter area is caused by increased reflectance of IR light by a hot mirror of the hidden object 404.

Figure 5A:
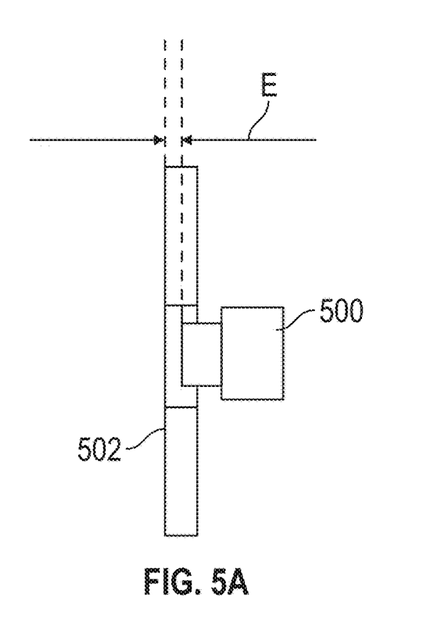
FIG. 5A illustrates a hidden object that creates an elevational difference with respect to a surface, namely where the hidden object is recessed at least partially behind the surface.
Figure 5B:
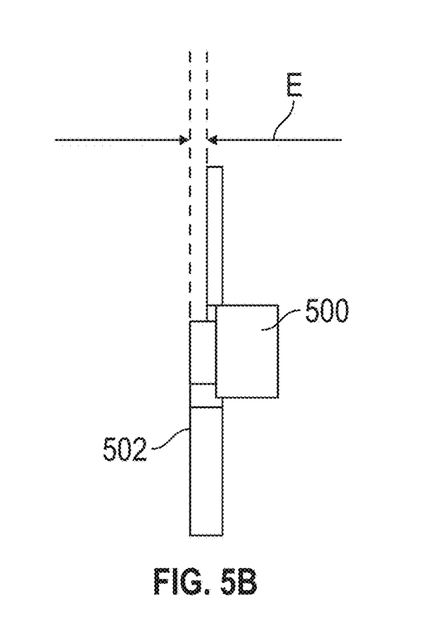
FIG. 5B illustrates a hidden object that creates an elevational difference with respect to a surface, namely where the hidden object extends at least partially in front of the surface.
Figure 5C:
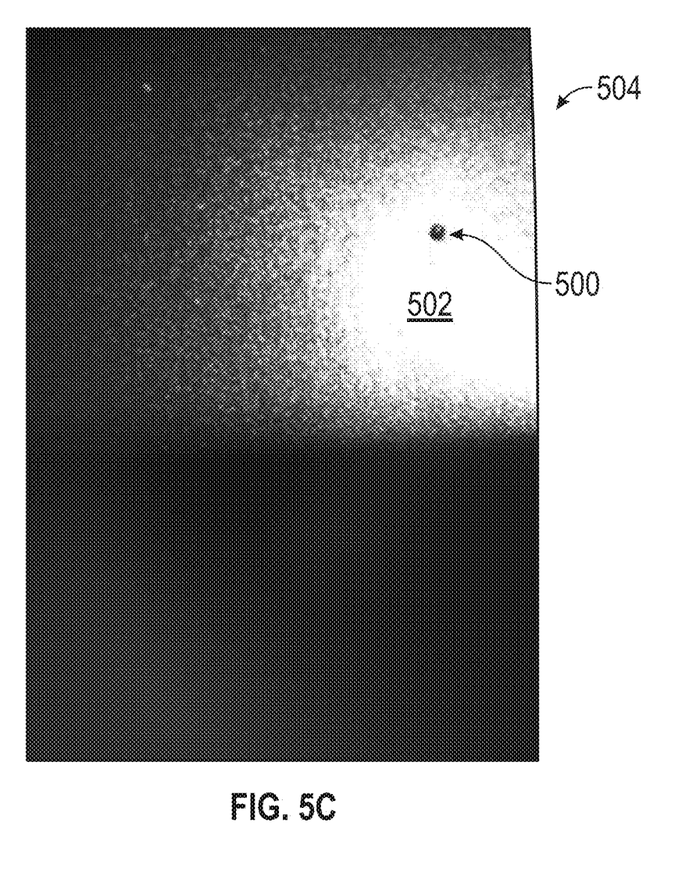
FIG. 5C is an image illustrating differences in spectral reflectance due to an elevational difference, which could correspond to either FIG. 5A or 5B.

In a similar manner, the hidden object detecting apparatus 104 can detect a hidden object associated with a surface based on the elevation changes relative to a surface. FIGS. 5A-5C each illustrate various examples of a hidden object 500 that could include a camera, microphone, or other device associated with a surface 502.

The relative uniformity or flatness of the surface 502 causes IR light to be reflected off the surface 502 in a manner that is substantially uniform across the surface 502. The hidden object 500 could be recessed behind the surface 502, as illustrated in FIG. 5A. The hidden object 500 is offset behind the surface 502 creating an elevational difference E between the hidden object 500 and the surface 502.

Alternatively, the hidden object 500 could create a raised area on the surface 502. For example, a bezel or lens of a hidden camera could extend through an aperture in the surface 502 creating a raised area relative to the surface 502. Differences in elevation between the hidden object 500 and the surface 502 can create differential spectral reflectance, allowing for detection of the hidden object 500 by a hidden object detecting apparatus of the present disclosure. At least a portion of the hidden object 500 protrudes in front of the surface 502 creating an elevational difference E between the hidden object 500 and the surface 502. FIG. 5C is an image 504 showing differential spectral reflectance to identify the hidden object 500 relative to the surface 502. This differential spectral reflectance could correspond to an elevational difference as depicted with respect to either FIG. 5A or 5B. In some instances, the differential spectral reflectance is enhanced when the surface 502 is a low contrast surface, such as a dark pigmented surface or a material with a matte finish.

Referring back to FIG. 1, in an example use case, the passengers 112 and 114 are engaged in a ride hailing trip in the vehicle 102. In general, interior cameras within vehicles may enable new customer experiences and features. To ensure the best customer, these cameras can be used to detect malicious and hidden devices. These cameras (e.g., hidden object detecting apparatuses) can be configured to scan, detect, and alert occupants to the presence of foreign/hidden devices. These checks could happen with or without occupants present to alert transit service providers (for example, the service provider 116) to inspect vehicles. The vehicle could also be configured to alert occupants overtly or discretely as desired.

For example, the vehicle 102 can include the hidden object detecting apparatus 104 that scans the surface 108 for hidden objects, such as hidden object 110. A second hidden object detecting apparatus 136 can be arranged to scan an opposing surface 138, such as another seat in the vehicle 102. When the hidden object 110 is detected, a message can be presented over the speakers of the vehicle 102 that the hidden object 110 has been detected. In general, many hidden object detecting apparatuses can be positioned throughout the vehicle 102 to scan the various surfaces in the vehicle where hidden objects may likely be placed.

Figure 6:
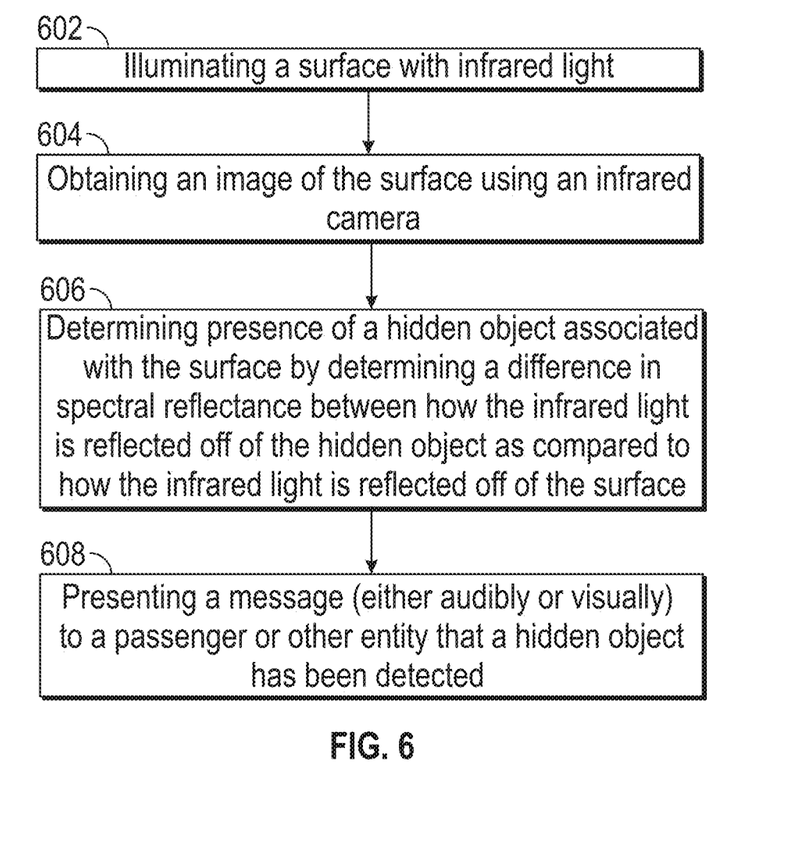
FIG. 6 is a flowchart of an example method of the present disclosure.

FIG. 6 is a flowchart of a method for detecting the presence of a hidden object. The method can include a step 602 of illuminating a surface with infrared light. The IR light could include IR and near-IR light. Next, the method includes a step 604 of obtaining an image of the surface using an infrared camera. The method can include processing of the image and a step of determining presence of a hidden object associated with the surface by determining a difference in spectral reflectance between how the infrared light is reflected off the hidden object as compared to how the infrared light is reflected off the surface. If a hidden object is detected, the method can include a step 608 of presenting a message (either audibly or visually) to a passenger or other entity that a hidden object has been detected.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method for detecting a hidden object in a vehicle, the method comprising:
    illuminating a surface within the vehicle with infrared light;
    obtaining an image of the surface using an infrared camera within the vehicle;
    determining a first spectral reflectance based on infrared light reflected by the surface;
    determining a second spectral reflectance based on infrared light reflected by the hidden object;
    determining a difference in spectral reflectance between the first spectral reflectance and the second spectral reflectance, wherein the difference in spectral reflectance is created by elevation changes relative to the surface caused by the hidden object, and wherein the elevation changes comprise an elevational difference between the hidden object and the surface;
    comparing the difference in spectral reflectance to a predetermined threshold value;
    determining, based on the comparison of the difference in spectral reflectance to the predetermined threshold value, a presence of the hidden object; and
    determining, based on the difference in spectral reflectance, that the hidden object is a camera with a lens having a heat absorbing mirror.

2. The method according to claim 1, wherein the hidden object further comprises a microphone.

3. The method according to claim 1, wherein the infrared light is reflected off of a filter material of the hidden object.

4. The method according to claim 3, wherein the filter material comprises a cut filter that is a hot mirror that reflects the infrared light to a greater degree than the surface to create the difference in spectral reflectance.

5. The method according to claim 3, wherein the filter material comprises a cut filter that is the heat absorbing mirror that absorbs the infrared light to a greater degree than the surface to create the difference in spectral reflectance.

6. The method according to claim 1, further comprising presenting a message that alerts a user when the hidden object is determined.

7. A device, comprising:
    an infrared light source;
    an infrared camera; and
    a controller comprising a processor and memory, the processor executes instructions stored in memory to:
        illuminate a surface using the infrared light source;
        obtain an image of the surface using the infrared camera;
        determine a first spectral reflectance based on infrared light reflected by the surface;
        determine a second spectral reflectance based on infrared light reflected by a hidden camera;
        determine a difference in spectral reflectance between the first spectral reflectance and the second spectral reflectance, wherein the difference in spectral reflectance is created by elevation changes relative to the surface caused by the hidden object, and wherein the elevation changes comprise an elevational difference between the hidden object and the surface;
        compare the difference in spectral reflectance to a predetermined threshold value;
        determine, based on the comparison of the difference in spectral reflectance to the predetermined threshold value, a presence of the hidden camera; and
        determine, based on the difference in spectral reflectance, that the hidden object is a camera with a lens having a heat absorbing mirror.

8. The device according to claim 7, wherein the surface is within a vehicle cabin.

9. The device according to claim 7, wherein the infrared light is reflected off of a filter material of the hidden camera.

10. The device according to claim 9, wherein the filter material comprises a cut filter that is a hot mirror that reflects the infrared light to a greater degree than the surface to create the difference in spectral reflectance.

11. The device according to claim 9, wherein the filter material comprises a cut filter that is the heat absorbing mirror that absorbs the infrared light to a greater degree than the surface to create the difference in spectral reflectance.

12. The device according to claim 7, wherein the processor is configured to present a message that alerts a user when the hidden camera is determined, the message being presented through an audio system of a human machine interface of a vehicle.

13. A vehicle, comprising:
an interior vehicle surface;
an infrared light source;
an infrared camera; and
a controller comprising a processor and memory, the processor executes instructions stored in memory to:
  illuminate the interior vehicle surface with infrared light using the infrared light source;
  obtain an image of the surface using the infrared camera; and
  determine a first spectral reflectance based on infrared light reflected by the surface;
  determine a second spectral reflectance based on infrared light reflected by a hidden camera associated with the interior vehicle surface;
  determine a difference in spectral reflectance between the first spectral reflectance and the second spectral reflectance, wherein the difference in spectral reflectance is created by elevation changes relative to the surface caused by the hidden object, and wherein the elevation changes comprise an elevational difference between the hidden object and the surface;
  compare the difference in spectral reflectance to a predetermined threshold value;
  determine a presence of the hidden camera based on the comparison of the difference in spectral reflectance to the predetermined threshold value; and
  determine, based on the difference in spectral reflectance, that the hidden camera comprises a lens having a heat absorbing mirror.

14. The vehicle according to claim 13, wherein the processor is configured to present a message that alerts a user when the hidden camera is determined, the message being presented through an audio system of a human machine interface of a vehicle.

15. The vehicle according to claim 13, wherein a filter material of the hidden camera comprises a cut filter that is a hot mirror that reflects the infrared light to a greater degree than the surface to create the difference in spectral reflectance.

16. The vehicle according to claim 13, wherein a filter material of the hidden camera comprises the heat absorbing mirror that absorbs the infrared light to a greater degree than the surface to create the difference in spectral reflectance.

17. The vehicle according to claim 13, wherein the surface is a low contrast surface having a dark pigmented surface or a matte finish and the hidden camera is disposed behind an aperture in the surface.

* * * * *